United States Patent Office 3,030,212
Patented Apr. 17, 1962

3,030,212
PROCESS FOR RIPENING BANANAS AND CITRUS FRUIT
Archibald M. Hyson and Maurice R. Stahler, Jr., Wilmington, Del., assignors to E. I. du Pont de Nemours and Company, Wilmington, Del., a corporation of Delaware
No Drawing. Filed June 1, 1961, Ser. No. 114,029
2 Claims. (Cl. 99—103)

This invention relates to the treatment of fruit with higher alcohols. It is more particularly directed to the treatment of bananas and citrus fruit with an alkyl alcohol containing between 6 and 14 carbon atoms to hasten the fruits' ripening.

It has been found that the ripening time of green bananas and citrus fruit can be significantly reduced by maintaining the fruit, after picking and during storage, in contact with a higher alcohol. The alcohols used according to this invention can be any of the alkyl alcohols containing between 6 and 14 carbon atoms, used alone or in combination. For the treatment of green bananas, lauryl alcohol is preferred. Any of the commercially available lauryl alcohols, which may or may not contain smaller amounts of lower and higher alcohols, can be used successfully. For the treatment of green citrus fruit it is preferred that n-hexyl or n-octyl alcohol be used.

The fruit to be treated can be maintained in contact with the desired alcohol in any convenient fashion. For example, the fruit can be placed in a closed chamber or container having an atmosphere of alcohol vapors. Such an atmosphere can be created by spraying or vaporizing the alcohol into the atmosphere, by simply leaving an open receptacle containing the alcohol in the container, or by suspending an absorbent article such as a sponge impregnated with the alcohol in the room or container.

This invention can also be practiced by wrapping the fruit in paper or the like impregnated with a suitable alcohol. In its simplest form, this invention is practiced by coating the fruit with an alcohol by means of a spray or a sponge, or by dipping the fruit in a dilute solution or dispersion of a suitable alcohol.

The total amount of the alcohol contacting the fruit should be from .0001% to 5%, by weight, of the fruit being treated. Preferably, the amount should be from .001% to 0.1% by weight.

When the fruit is coated directly with the alcohol, the fruit should be given a thin coating for the process to be effective.

When the fruit is subjected to vapor treatment, the concentration of alcohol vapors must be adjusted so that the recommended amount of alcohol will come in contact with the fruit. The precise concentration of vapors in any given application will therefore depend on the size and temperature of the chamber, the amount of fruit being treated, the vapor pressure of the alcohol, and the like, and can easily be determined by one skilled in the art.

The process of this invention can be practiced in conjunction with other processes designed to control ripening of fruit after picking and during storage or transit.

This invention will be more readily understood and practiced by referring to the following illustrative examples:

*Example I*

Green bananas are placed in a ripening chamber containing lauryl alcohol at a concentration of 0.01% by weight of the bananas. Pronounced ripening is observed in 24 hours. In 48 hours the bananas are completely yellow. Taste tests demonstrate that these bananas have ripened normally without any loss of palatability.

*Example II*

Regreened Florida Valencia oranges are treated with octyl alcohol by swabbing them with absorbent paper saturated with the alcohol. These oranges are placed in a sealed polyethylene bag. Untreated control oranges are placed in a similar sealed polyethylene bag.

After 24 hours storage at room temperature, the oranges treated with octyl alcohol have developed a typical orange coloration while the control oranges remain green.

Similar results are obtained by treating grapefruit and tangerines with octyl alcohol in this manner.

Lauryl alcohol can be substituted for octyl alcohol, with similar results.

*Example III*

Regreened Florida Valencia oranges are treated according to the procedure set forth in Example I, substituting decyl alcohol for octyl alcohol. Similar results are observed.

*Example IV*

Regreened Florida Valencia oranges are placed in a polyethylene bag together with an open container of n-hexyl alcohol. After 5 days of storage, the treated oranges are quite orange in color while control oranges show only a partial light yellow coloration.

Similar results are also obtained with grapefruit and tangerines.

This application is a continuation-in-part of copending application Serial No. 852,626, filed November 13, 1959.

The embodiments of the invention in which an exclusive property or privilege is claimed are:

1. A process for the ripening of bananas and citrus fruit, said process comprising contacting said fruit with an alkyl alcohol containing from 6 to 14 carbon atoms.

2. The process of ripening bananas, said process contacting said bananas with lauryl alcohol.

References Cited in the file of this patent
UNITED STATES PATENTS

| | | |
|---|---|---|
| 246,664 | Cromwell | Sept. 6, 1881 |
| 1,817,875 | Broadbent | Aug. 4, 1931 |
| 2,348,851 | Rotheim | May 16, 1944 |
| 2,841,190 | Scheck | July 1, 1958 |

UNITED STATES PATENT OFFICE
CERTIFICATE OF CORRECTION

Patent No. 3,030,212

April 17, 1962

Archibald M. Hyson et al.

It is hereby certified that error appears in the above numbered patent requiring correction and that the said Letters Patent should read as corrected below.

Column 2, line 50, after "process" insert -- comprising --.

Signed and sealed this 31st day of July 1962.

(SEAL)
Attest:

ERNEST W. SWIDER
Attesting Officer

DAVID L. LADD
Commissioner of Patents